June 10, 1958 — LA VERNE R. PHILPOTT — 2,838,752
SWEEP CIRCUIT GENERATOR
Filed June 8, 1944 — 2 Sheets-Sheet 1

Inventor
LA VERNE R. PHILPOTT
By W. Glenn Jones
Attorney

June 10, 1958

LA VERNE R. PHILPOTT
SWEEP CIRCUIT GENERATOR 2,838,752

Filed June 8, 1944

2 Sheets-Sheet 2

Inventor
LAVERNE R. PHILPOTT

By W. Glenn Jones

Attorney

United States Patent Office 2,838,752
Patented June 10, 1958

2,838,752

SWEEP CIRCUIT GENERATOR

La Verne R. Philpott, Rochelle Park, N. J., assignor, by mesne assignments, of five-ninths to Robert M. Page, one-ninth to Harold G. Bowen, and one-fourth to Leo C. Young Application June 8, 1944, Serial No. 539,373

17 Claims. (Cl. 343—13)

(Granted under Title 35, U. S. Code (1952), sec. 266)

This invention relates to a precision timing means of the type which displays the signals to be timed upon the linear beam trace of a cathode ray tube, and particularly to a means for producing a movable index marker on the beam trace thereof.

Cathode ray tube timing circuits of this type, that is, where the beam trace represents a linear function of time, are readily adaptable to radio echo detection systems for purposes of indicating object range. In which case, the pulse emissions from the pulse transmitter are synchronized with the initiation of the beam trace, while the energy reflections from remote objects are disposed thereon, displaced from the initial edge thereof by a distance corresponding to the range of the object. Range measurements obtained by this method will provide an approximate indication of the disposition of the objects within the field of scan of the system, but will not suffice for precise range measurements since, for example, one inch of trace length may be employed to represent 2000 yards of range or more, thereby limiting the accuracy with which range may be interpolated from the trace.

It is therefore an object of this invention to provide a means for producing an index marker on the beam trace of a cathode ray tube, having arranged therewith a calibrated means for adjusting the time occurrence of the same.

It is another object of this invention to provide a means for facilitating precision range measurements in radio echo detection apparatus.

It is another object of this invention to provide a means for utilizing the beam sweep voltage of a cathode ray oscilloscope for producing a variable time phase index marker on the beam trace thereof.

Other objects and features of the invention will become apparent upon a careful consideration of the following detailed description when taken together with the accompanying drawings.

Figure 1:
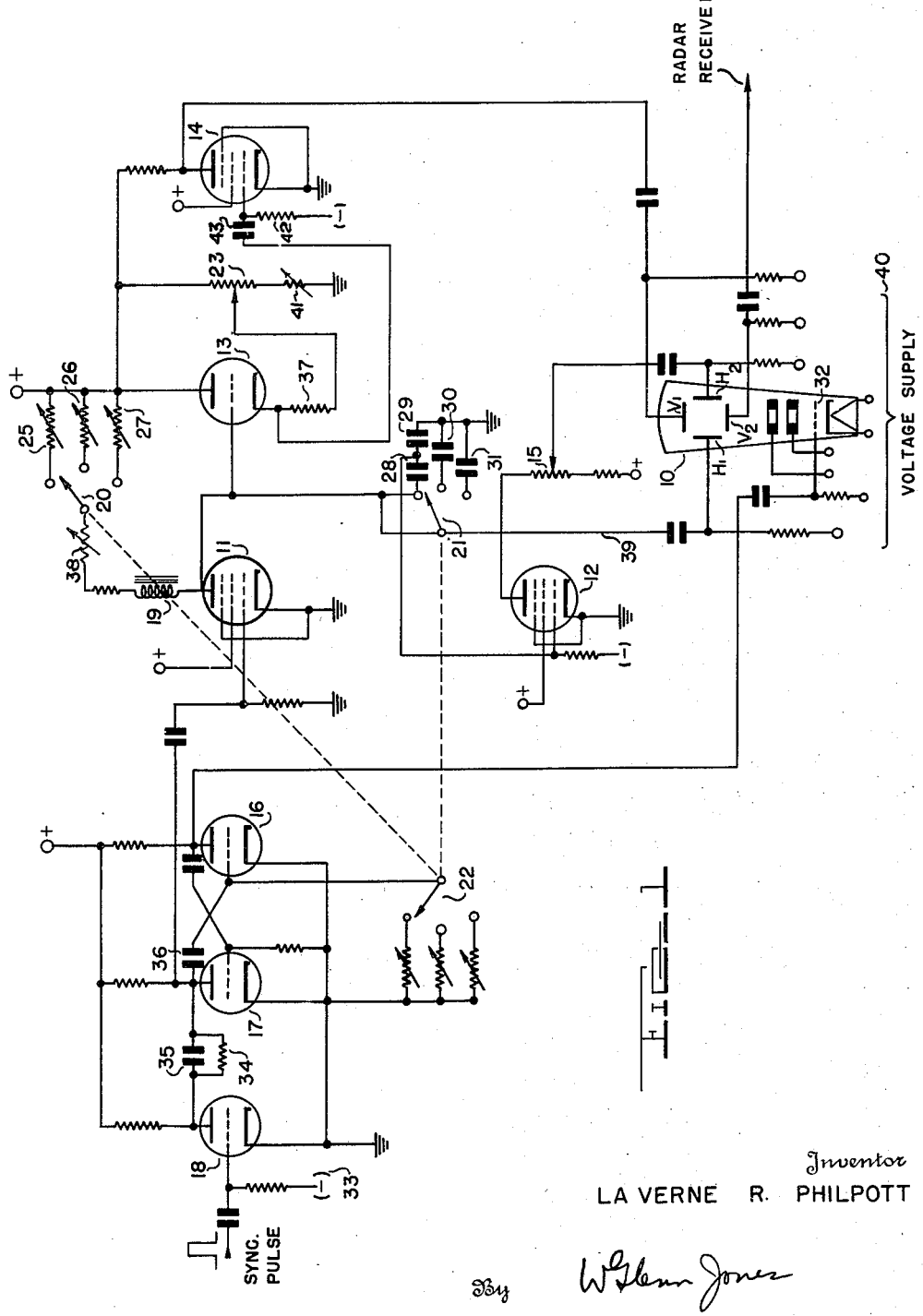
Figure 2:
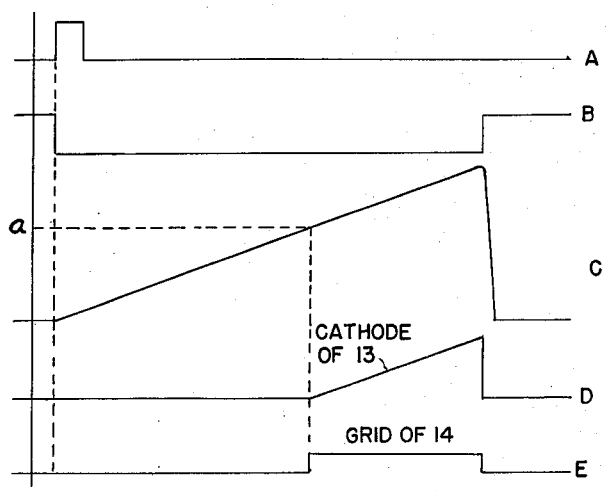
Figure 3:
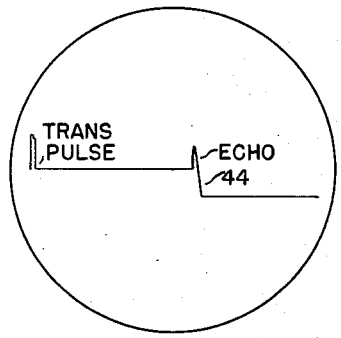
Figure 4:
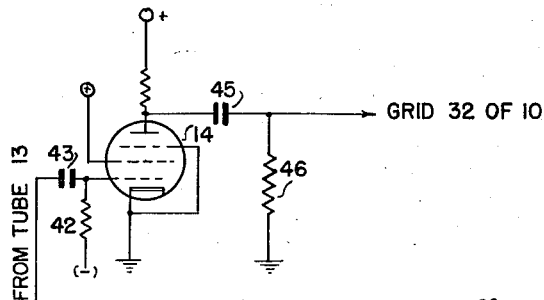

Fig. 1 is a schematic diagram of a preferred embodiment of the invention, Fig. 2 is a series of voltage plots illustrating certain voltage variations, which occur at various points in the circuit during a complete cycle of operation thereof, Fig. 3 is a face view of a cathode tube indicator illustrating typically the disposition of a time marker signal as obtained from the circuit of Fig. 1, and Fig. 4 is a schematic diagram of a modified arrangement for applying the marker signal to the cathode ray tube.

Reference is now had more particularly to Fig. 1 wherein there is shown one embodiment of the invention, including an electron beam sweep voltage generator for imparting linear motion to the electron beam of the cathode ray tube indicator 10, and a variable time phase index marker generator adapted to produce an adjustable time phase marker pulse on the electron beam sweep. The sweep generator consists of an inductance capacitance charging combination which is rendered responsive to the operation of a multivibrator which in turn is keyed as a slave to the radio transmitter. While the marker pulse generator is driven by the output and the sweep generator in such a manner as to assure accurate and absolute timing of the marker pulse on the beam sweep.

The sweep circuit is more especially a push-pull saw-tooth voltage generator the output of which is obtained from the respective plates of tubes 11 and 12 and thus aplied to the horizontally opposed deflecting plates $H_1$ and $H_2$ of the cathode ray tube 10; arranged with the tube 11 and adapted to produce a steadily rising voltage on the plate thereof is the inductance capacitance charging circuit comprising inductance 19 and condensers 29, 30, and 31, the latter being connected through the multiple throw switch 21. The values of the foregoing condensers are chosen to provide a progressively increasing capacitance in the charging circuit for each progressive position of the switch 21. The inception and duration of the sweep is controlled by a multivibrator comprising tubes 16 and 17 which is keyed by the radio transmitter through tube 18.

In operation, pentode 11, is biased normally conducting until rendered blocked by the application of a negative wide gate pulse to its control grid, which pulse is obtained from the plate of tube 17 of the multivibrator in a manner to be more fully described hereinafter. When tube 11 is blocked, the condenser connected to the switching tube 11 through switch 21 will start to charge positively through inductance 19 and resistance 38, thereby driving the horizontal deflecting plate $H_1$ positive through lead 39. Simultaneously therewith the positive rise in plate voltage of tube 11 is coupled through condenser 28 to the control grid of the phase inverter tube 12 which drives its plate and hence the deflecting plate $H_2$ negative at the same rate as the deflecting plate $H_1$ is going positive.

By inserting a large inductance coil 19 say 400 or 500 henries in the charging circuit, the linearity of the sweep may be maintained since the inductance coil will effectively extend the linear portion of the charging voltage. The beam sweep thus produced will proceed slowly across the screen of the cathode ray tube 10 (from left to right for example) during the blocked period of the switching tube 11, at the termination of which tube 11 will be re-established conducting thus causing the charging condenser, connected by switch 21, to quickly discharge through tube 11 and consequently cause the electron beam to quickly return to the starting point of the sweep. In radio echo detection use the period of the blocking pulse obtained from the multivibrator will control the range coverable by the sweep since it governs the time allotted for condenser to charge, while the setting of switch 21 will provide a charging condenser capable of developing full scale beam deflection voltage within the time allotted by the multivibrator setting.

Furthermore, regulation of resistance 38 will control the amount of charging current available to the charging condenser and hence the slope of the beam sweep voltage, while switch 20 is provided adapted to contact a series of small resistances 25, 26, and 27 for purposes of trimming up the setting of resistance 38. These variable resistances will usually appear in a form of a screw driver adjustment projected from the front or back panel of the apparatus.

In most cases it is desired to produce the sweep in a horizontal plane; for this purpose a power supply indicated generally at 40 is provided having means for biasing the vertical deflecting plates $V_1$ and $V_2$ in such a manner as to cause the sweep to occur in the central horizontal plane of the cathode ray tube screen. To assure full scale deflection of the electron beam and also to prevent over deflection, an amplitude control potentiometer 15 is provided, interposed between the output of the phase inverter tube 12 and the horizontal deflecting plate H₂.

The obvious advantages of this sweep circuit are two-fold. The first being zero time delay between the instant of keying the generator and the inception of the sweep voltage. This advantage results from the fact that the switching tube is sustained normally conducting so that its plate voltage starts to rise immediately upon being keyed, while prior art types of sweep generators relied on the keying voltage to first discharge the condenser and subsequently proceed with the production of the linear rising voltage. The second advantage is reduced power supply requirements resulting from push-pull type beam deflection.

As indicated the multivibrator keying tube 18 is biased non-conducting by means of a negative voltage applied to its grid at 33 so that its plate potential will be at a substantially high value. The plate of this tube is then coupled through resistance 34 and capacitances 35 and 36 to the grid of tube 16 to thus hold tube 16 conducting and tube 17 blocked. The plate of tube 16 which is coupled to the intensity grid 32 of the cathode ray tube is then at a reduced potential, while the plate of tube 17 which is coupled to the control grid of the switching tube 11 is at a substantially high value. In this condition, that is just prior to the operation of the pulse transmitter, tube 17 will hold the plate potential of the switching tube down so that the electron beam will be at the starting point of the sweep, while tube 16 will keep the beam blanked out. To synchronize the operation of the sweep circuit with a pulse emission from the transmitter, a suitable positive synchronizing pulse obtained from a appropriate point in the transmitter, such as the cathode circuit of the oscillator or modulator is applied to the grid of the keying tube 18. The plate of tube 18 will then drive negative simultaneously with the keying of the pulse transmitter which in turn drives tube 16 to cut-off and hence tube 17 conducting thereupon causing tube 16 to unblock the electron beam and tube 17 to key switching tube 11 into operation to initiate the sweep voltage therefrom. The period for which tube 16 will remain non-conducting and hence tube 17 conducting, after being keyed in the foregoing manner will depend upon the time constant disposed in the grid circuit of tube 16, comprising capacitance 36 and one of the bank of resistances contacted by switch 22. As before, the value of the respective resistances in this bank are so chosen and arranged that progressive settings of switch 22, that is from the extreme top position to the extreme bottom position, will progressively extend the period which tube 16 will remain blocked and hence tube 17 conducting. Most generally, switches 20, 21, and 22 are mechanically ganged together and correlated in such a manner that the period of the multivibrator as regulated by switch 22 will correspond to the sweep range as controlled by the settings of switches 20 and 21. For example, when all the switches are set in the extreme top position the range displayed by the sweep will correspond to 0-25,000 yards and in the next position down 0-75,000 yards and so forth.

As previously mentioned, a general indication of the disposition of the objects within the field of scan of the system may be had by recording the echo signals on an ordinary linear sweep of the class just described. Accurate range measurements, however cannot be obtained by this type indication; for which reason a variable time phase index marker circuit is provided comprising a cathode follower tube 13 which is driven from the output of the switching tube 11. Disposed in the cathode circuit of tube 13 is a potentiometer 23 energized by a source of positive potential and adapted to bias tube 13 to cut-off. Hence the saw-tooth voltage input will at first cause no increase in output from tube 13 as taken from the cathode resistance 37 and consequently no input to the buffer amplifier 14 until the input voltage exceeds the cut-off bias of the tube. Where upon the potential drop across resistance 37 will follow the input to the grid of tube 13 as indicated in plot D of Fig. 2. Thus the output of tube 13 will likewise be a linear rising voltage having a slope appoximately equal to the slope of the input voltage, but delayed in time by an amount corresponding to the time required for the input voltage to overcome the bias of the tube as set by potentiometer 23. The voltage developed across resistance 37 is then applied through a differentiating circuit comprising capacitance 43 and resistance 42 to the control grid of tube 14. A linearly rising voltage such as this applied to a differentiating circuit will produce a single step-like voltage output therefrom as indicated in plot E of Fig. 2. The time occurrence of the step corresponds to the inception of the linear rise in voltage, while the amplitude of the step is a function of the slope of the input voltage. Consequently the step-like voltage applied to the grid of tube 14 will effectively and abruptly change the bias on the vertical deflecting plate V₁ of the cathode ray tube to cause a corresponding change in the plane of the beam sweep. Since the setting of potentiometer 23 controls the time delay between the inception of the beam sweep voltage and the inception of the output across resistance 37 it likewise controls the position of the step on the beam sweep. Thus by calibrating potentiometer 23 in range and manipulating the same until coincidence between the step in the beam sweep and an echo is obtained the range of the echo may be read directly from the potentiometer.

As each setting of the mechanically ganged switches 20, 21 and 22 will change the slope of the beam sweep voltage it would appear that a like change in the amplitude of the step would occur. To avoid this action tube 14 is biased nearly two volts negative so that its grid will readily draw current and effectively standardize the amplitude of the step-like voltage output from this tube. Furthermore since tube 13 is direct coupled to tube 11 some means must be provided to bias the cathode of this tube in compensation for the voltage on its grid. Such a means appears in the form of a potentiometer 41 disposed in series with the range potentiometer 23. This potentiometer also serves as a zero centering device for the range potentiometer 23 to correct for inaccuracies in the setting of the latter. For example, the calibration of the range potentiometer may be checked by comparing the range setting thereof with a series of equally spaced and accurately known time signals such as those obtained from the circuit disclosed in my patent application entitled "Calibrating Apparatus" Serial No. 537,286, filed May 25, 1944, now United States Patent No. 2,643,288, granted June 23, 1953. Any deviation between the setting of the potentiometer and the range as represented by one of these time marker signals may be remedied by manipulation of potentiometer 41.

To facilitate an understanding of the procedure followed in range determination by use of an index marker of the foregoing type reference is had to Fig. 2. The first plot A in this figure illustrates a synchronizing pulse obtained from the transmitter and used for keying tube 18. In the second plot B there is shown the variation in plate voltage of tube 17 produced in response to the keying voltage A and used for operating the switching tube 11 to generate a linear rising saw-tooth voltage on the plate thereof similar to that shown in the third plot C. As shown this voltage is applied both to the horizontal deflecting plate H₁ of the cathode ray tube and to the input of tube 13 in such a manner that it exceeds the cut off bias of the latter at point a. Whereupon the voltage developed across the resistance 37 will follow the input to the grid of tube 13 as illustrated in the fourth plot D. This voltage is then applied to the grid of the buffer amplifier 14 through a differentiating circuit which produces an effective input to this tube similar to that illustrated at E. A typical illustration of a range measurement made by the present system is shown in Fig. 3 wherein the step-like marker 44 which is caused by the abrupt change in bias of the vertical deflecting plate $V_1$ in response to the output of tube 14, is used to center an echo signal, the range of which is read directly from potentiometer 23.

Although I have shown and described this invention as applied to a radio echo detection system for purposes of securing precise range measurements it is to be understood that time measurements of signals obtained from other sources may be made in the same manner as that presented without departing from the spirit of the invention.

It is also to be understood that the means for indicating the position of the index marker or the cathode ray tube does not necessarily have to conform to the specific example cited, i. e. beam deflection. For example intensity modulation could be used by applying the output of amplifier 14 through an RC differentiating circuit to the intensity grid of the cathode ray tube instead of to one of the deflecting plates. Such a circuit is shown in Fig. 4 wherein the output of the amplifier 14 is coupled to the intensity grid 32 of the cathode ray tube 10 through an RC differentiating circuit comprising capacitance 45 and resistor 46.

The invention described herein may be manufactured and used by or for the Government of the United States of America for governmental purposes without the payment of any royalties thereon or therefor.

What is claimed is:

1. An electron beam sweep circuit for a cathode ray tube, comprising a means for producing a saw-tooth wave, means for deflecting said electron beam in a first direction in accordance with said saw-tooth wave, an electron discharge tube having input and output circuits connected thereto, means biasing said follower tube below cut-off, means connecting the output of said saw-tooth generating means to the input of said tube, means differentiating the output of said tube, and means deflecting said electron beam in a direction angularly disposed to said first direction in accordance with the differentiated output of said tube.

2. An electron beam sweep circuit for a cathode ray tube, comprising a means for producing a saw-tooth voltage wave, a means for deflecting said electron beam in a first direction in accordance with said saw-tooth wave, an electron discharge tube having input and output circuits connected thereto, means biasing said tube below cut-off, means connecting the output of said saw-tooth wave generator to the input of said tube, means for regulating the bias on said tube so as to control the instant at which said tube will start to conduct, means differentiating the output of said tube, and means deflecting said electron beam in a second direction angularly disposed to said first direction in accordance with the differentiated output of said tube.

3. An electron beam sweep circuit for a cathode ray tube comprising a means for producing a saw-tooth voltage wave, a means for deflecting said electron beam in a first direction in accordance with said saw-tooth wave, an electron discharge tube having input and output circuits connected thereto, means biasing said tube below cut-off, means connecting the output of said saw-tooth wave generator to the input of said tube, means differentiating the output of said tube, and means producing a marker on the screen of the cathode ray tube with said electron beam in accordance with the differentiated output of said tube.

4. An electron beam sweep circuit for a cathode ray tube comprising a means for producing a saw-tooth voltage wave, a means for deflecting said electron beam in a first direction in accordance with said saw-tooth wave, an electron discharge tube having input and output circuits connected thereto, means biasing said tube below cut-off, means connecting the output of said saw-tooth wave generator to the input of said tube, means regulating the bias of said tube so as to control the instant at which the tube will start to conduct, means differentiating the output of said tube and means producing a marker on the screen of the cathode ray tube with said electron beam in accordance with the differentiated output of said tube.

5. An electron beam sweep circuit for a cathode ray tube, comprising a means for producing a saw-tooth voltage wave, a means for deflecting said electron beam in a first direction in accordance with said saw-tooth wave, an electron discharge tube having input and output circuits connected thereto, means biasing said tube below cut-off, means connecting the output of said saw-tooth wave generator to the input of said cathode follower, means differentiating the output of said tube thus producing a step-like voltage wave having an amplitude proportional to the slope of said saw-tooth wave, a second vacuum tube adapted to receive the differentiated output of said tube and being so biased as to standardize the step-like voltage output therefrom, and means deflecting said electron beam in a second direction angularly disposed to said first direction in accordance with the output of said second vacuum tube.

6. An electron beam sweep circuit for a cathode ray tube, comprising a means for producing a saw-tooth voltage wave, a means for deflecting said electron beam in a first direction in accordance with said saw-tooth wave, an electron discharge tube having input and output circuits connected thereto, means biasing said tube below cut-off, means connecting the output of said saw-tooth wave generator to the input of said tube, means regulating the bias on said tube to control the instant at which said tube will start to conduct means differentiating the output of said tube thus producing a step-like voltage wave having an amplitude proportional to the slope of said saw-tooth wave, a second vacuum tube adapted to receive the differentiated output of said tube and being so biased as to standardize the step-like voltage output therefrom, and means deflecting said electron beam in a second direction angularly disposed to said first direction in accordance with the output of said second vacuum tube.

7. In a radio echo system having a pulse transmitter and a means for repetitively pulsing the same, a cathode ray tube indicator circuit, comprising a means adapted to produce a saw-tooth wave in response to a portion of the pulse energy from said pulse transmitter, means for deflecting the electron beam of said cathode ray tube in a first direction in accordance with said saw-tooth wave, an electron discharge tube having input and output circuit connected thereto, means biasing said tube to below cut-off, means connecting the output of said saw-tooth generating means to the input of said tube, means differentiating the output of said tube, and means deflecting said electron beam in a second direction angularly disposed to said first direction in accordance with said differentiated output.

8. In a radio echo system having a pulse transmitter and a means for repetitively pulsing the same, a cathode ray tube indicator circuit, comprising a means adapted to produce a saw-tooth wave in response to a portion of the pulse energy from said pulse transmitter, means for deflecting the electron beam of said cathode ray tube in a first direction in accordance with said saw-tooth wave, an electron discharge tube having input and output circuit connected thereto, means biasing said tube to below cut-off, means connecting the output of said saw-tooth generating means to the input of said tube, means regulating said bias to said cathode follower tube to control the instant at which said tube will start to conduct, means differentiating the output of said tube, and means deflecting said electron beam in a second direction angularly disposed to said first direction in accordance with said differentiated output.

9. A method of measuring the time interval between a transmitted impulse and echo pulses detected on an oscillograph in response to the transmitted impulse, comprising establishing a reference time point in synchronism with the transmission of said impulse, building up a first potential at a given rate starting with said reference point, effecting a voltage rise when said first potential reaches a given value, producing in response to said voltage rise a marker pulse indication on the screen of said oscillograph, and controlling the said given value of said first potential to shift the marker pulse indication to coincide with a particular echo pulse as viewed on the oscillograph to determine the time interval represented by the location of such echo pulse with respect to said reference point.

10. Pulse generating apparatus comprising a space current device having an anode, a cathode and a control electrode, means for supplying space current to said device when said device is in a conducting condition, a circuit connecting said control electrode and said cathode, means for repeatedly producing and impressing upon said control electrode with respect to a point of reference potential in said circuit an exponentially rising potential, means for impressing a potential upon said cathode with respect to said reference potential, conduction being initiated in said device when the potential of said control electrode has increased sufficiently with respect to the potential of said cathode, means for producing a pulse at the time that conduction is initiated in said device and means for varying the time interval elapsing between the starting time of said exponentially rising potential and the time of production of said pulse comprising means for varying said cathode potential with respect to said reference potential.

11. An electron beam sweep circuit for a cathode ray tube comprising, means producing a saw-tooth voltage wave, means deflecting the electron beam of said cathode ray tube in one direction in accordance with said sawtooth voltage wave, means operative responsive to and coincident with the attainment of a preselected amplitude by said saw-tooth voltage wave to produce an abrupt potential difference, and means deflecting the electron beam of said cathode ray tube in a second direction substantially at right angles to said one direction in response to said potential difference.

12. Means for measuring the time displacement between first and second groups of pulses comprising a resistance-capacitance network having a predetermined time constant, an electronic circuit coupled to said network to control the periodic charge and discharge thereof in synchronism with said second group of pulses, a second electronic circuit to generate an electrical impulse, a third electronic circuit operated by a portion of the potential developed across said network to control said second electronic circuit, oscilloscope means for indicating the time relation of said pulses and said impulse, and means to adjust the magnitude of the charge across said network necessary to vary the timing of said electrical impulse until the indications of said impulse and said first group of pulses reach a predetermined relationship, said last-named means being calibrated in terms of said time displacement.

13. In a system for measuring recurrent substantially equal time intervals, said system including a source of electromotive force, a resistor and a condenser in series connection with said source of electromotive force, and a potentiometer to establish a reference potential of fixed value relative to the potential of said source of electromotive force, the method which comprises selecting an intermediate point on said potentiometer, starting a transient current in said condenser through said resistor from said source of electromotive force simultaneously with the beginning of each said time interval, and comparing the potential of said selected point on the potentiometer with the potential of said condenser at the end of each said time interval.

14. A time measuring system comprising an electronic device having an anode, a cathode and a control electrode, means for producing and impressing upon said control electrode an exponentially rising potential of fixed time constant, means for applying a potential to said cathode and means for varying said cathode potential to determine a measured time delay period with respect to the start of said exponentially rising potential by an amount determined by said cathode potential.

15. An electron beam sweep circuit for a cathode ray tube comprising means for producing a sawtooth wave of triangular form, means for deflecting said electron beam in a first direction in accordance with said sawtooth wave, a wave repeater comprising an electron discharge tube having input and output elements and having input and output circuit connected thereto, means connecting the output of said sawtooth generating means to the input of said tube, means applying a biasing potential to the elements of said tube to render said tube ineffective to repeat said sawtooth wave below a certain instantaneous value thereof, means differentiating the output of said tube, and means deflecting said electron beam in a direction angularly disposed to said first direction in accordance with the differentiated output of said tube.

16. In a radio echo system having a pulse transmitter and a means for repetitively pulsing the same, a cathode ray tube indicator circuit, comprising a means adapted to produce a saw-tooth wave in response to a portion of the pulse energy from said pulse transmitter, means for deflecting the electron beam of said cathode ray tube in a first direction in accordance with said saw-tooth wave, a wave repeater comprising an electron discharge tube having input and output elements and having input and output circuits connected thereto, means connecting the output of said sawtooth generating means to the input of said tube, means applying a biasing potential to the elements of said tube to render said tube ineffective to repeat said sawtooth wave below a certain instantaneous value thereof, means to vary the value of said biasing potential to vary the instant at which said tube becomes effective to repeat said sawtooth wave, means differentiating the output of said tube, and means deflecting said electron beam in a direction angularly disposed to said first direction in accordance with the differentiated output of said tube.

17. Pulse generating apparatus comprising a space current device having an anode, a cathode and an input electrode, means for supplying space current to said device when said device is in a conducting condition, a circuit connecting said input electrode and said cathode, means for repeatedly producing and impressing upon said input electrode with respect to a point of reference potential in said circuit an exponentially rising potential, means for impressing a potential upon said cathode with respect to said reference potential, conduction being initiated in said device when the potential of said input electrode has increased sufficiently with respect to the potential of said cathode, means for producing a pulse at the time that conduction is initiated in said device and means for varying the time interval elapsing between the starting time of said exponentially rising potential and the time of production of said pulse comprising means for varying said cathode potential with respect to said reference potential.

References Cited in the file of this patent
UNITED STATES PATENTS

| | | |
|---|---|---|
| 2,089,430 | Roys et al. | Aug. 10, 1937 |
| 2,275,460 | Page | Mar. 10, 1942 |
| 2,286,894 | Browne et al. | June 16, 1942 |
| 2,315,848 | Geohegan | Apr. 6, 1943 |
| 2,355,363 | Christaldi | Aug. 8, 1944 |
| 2,414,323 | Moe | Jan. 14, 1947 |